May 20, 1958 R. W. DE LANCEY 2,835,321
ELECTRIC CONTROL SYSTEM FOR FUEL BURNING EQUIPMENT
Filed Aug. 10, 1954 10 Sheets-Sheet 4
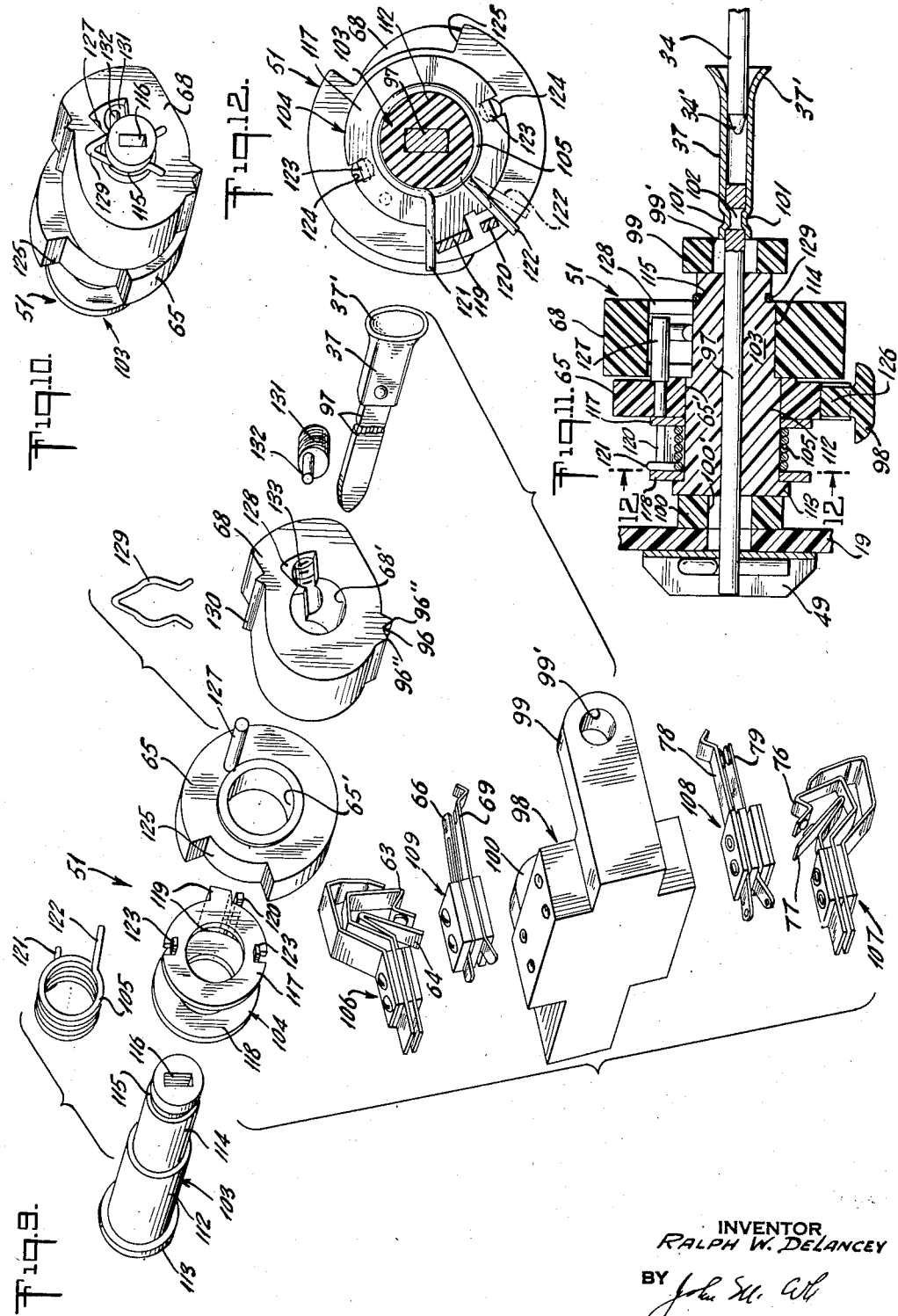
INVENTOR
RALPH W. DELANCEY
BY
ATTORNEY

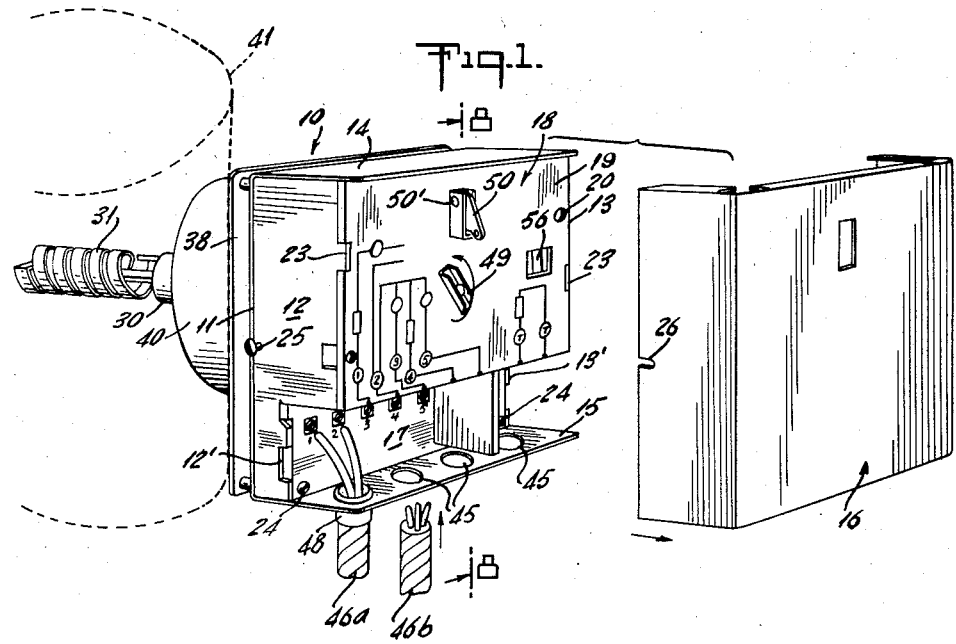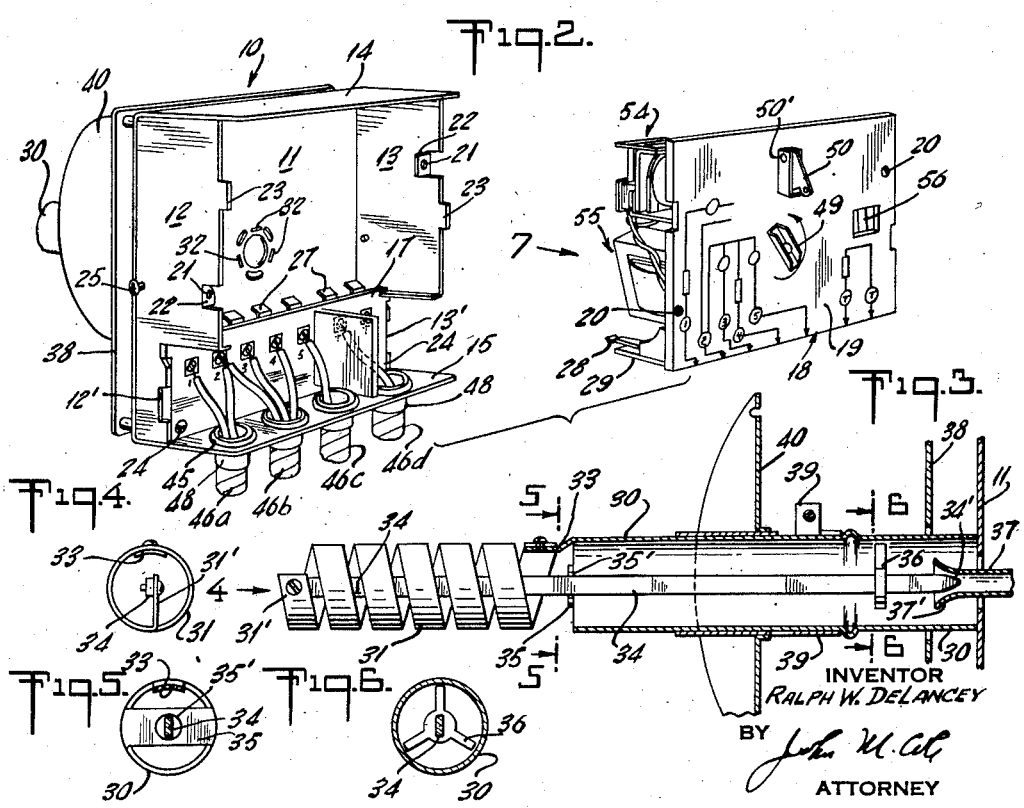

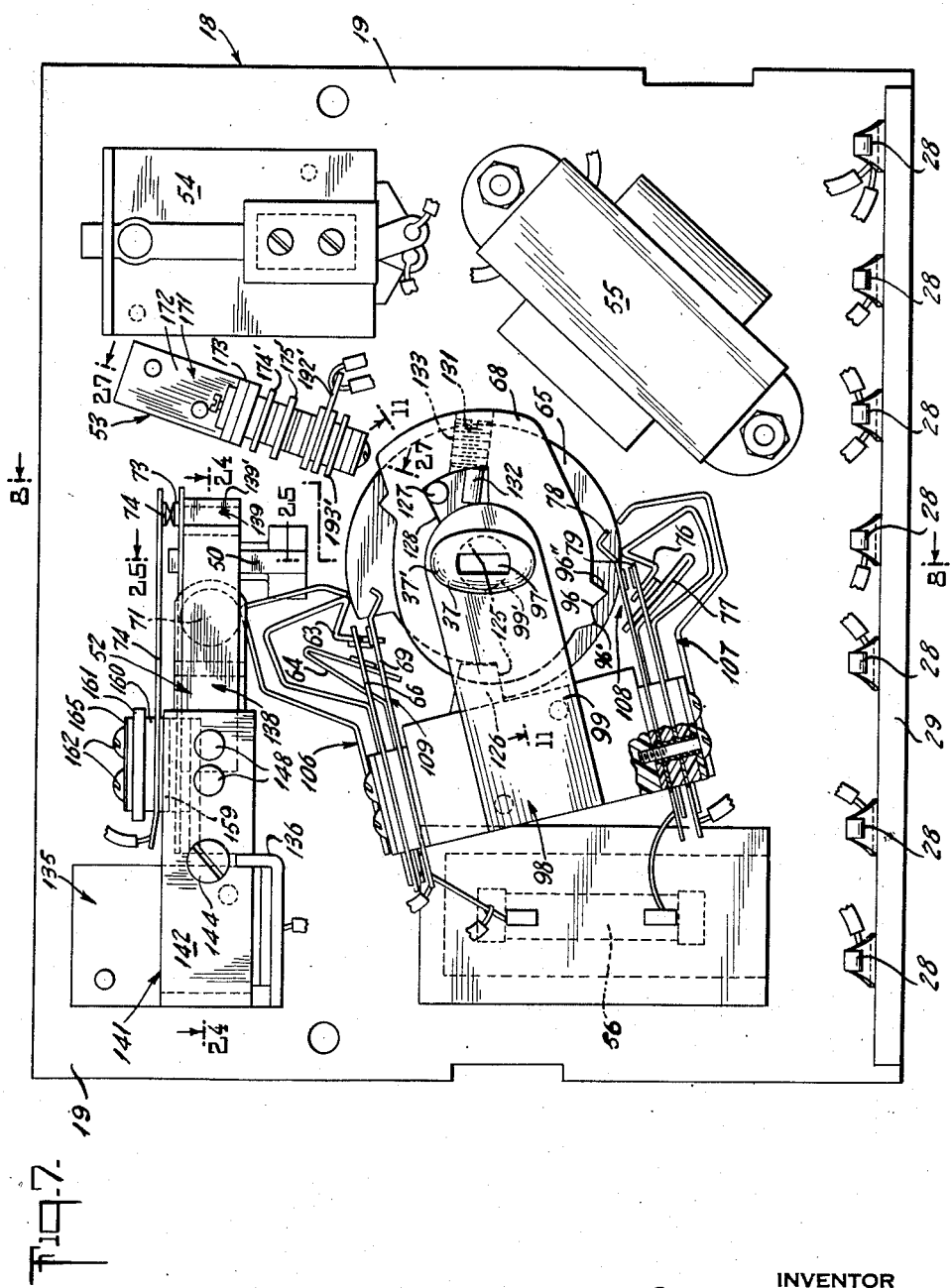

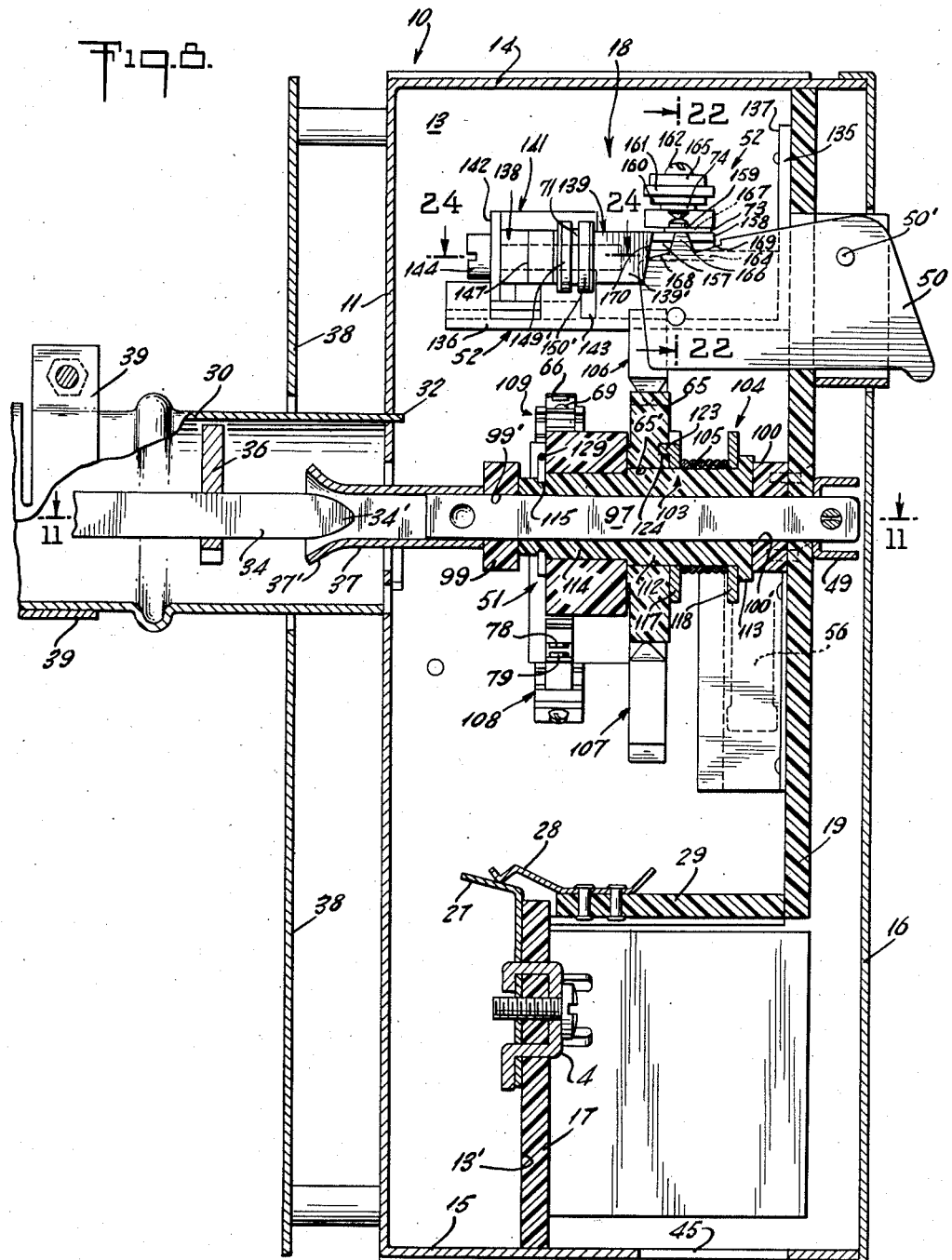

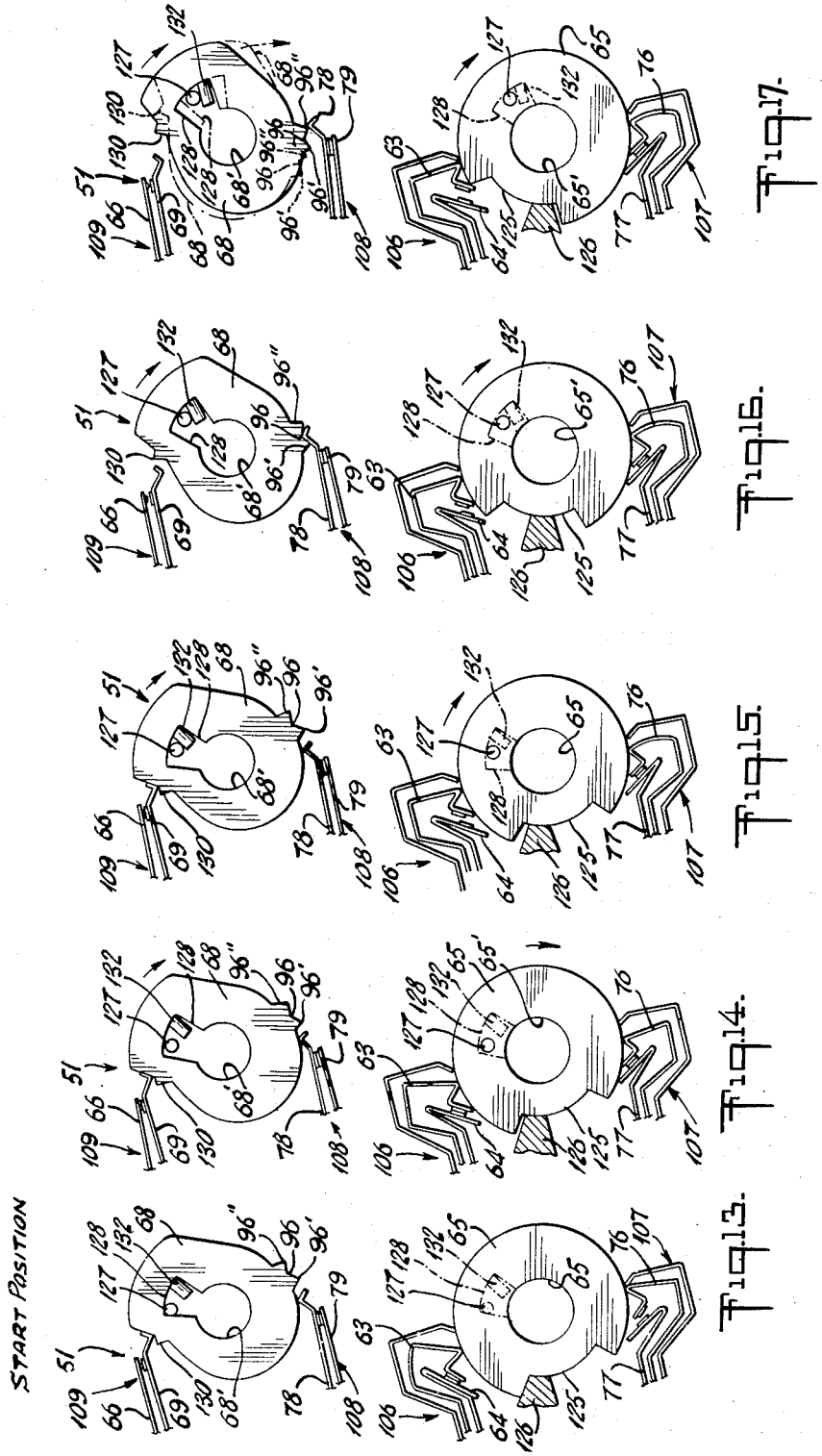

RUN POSITION

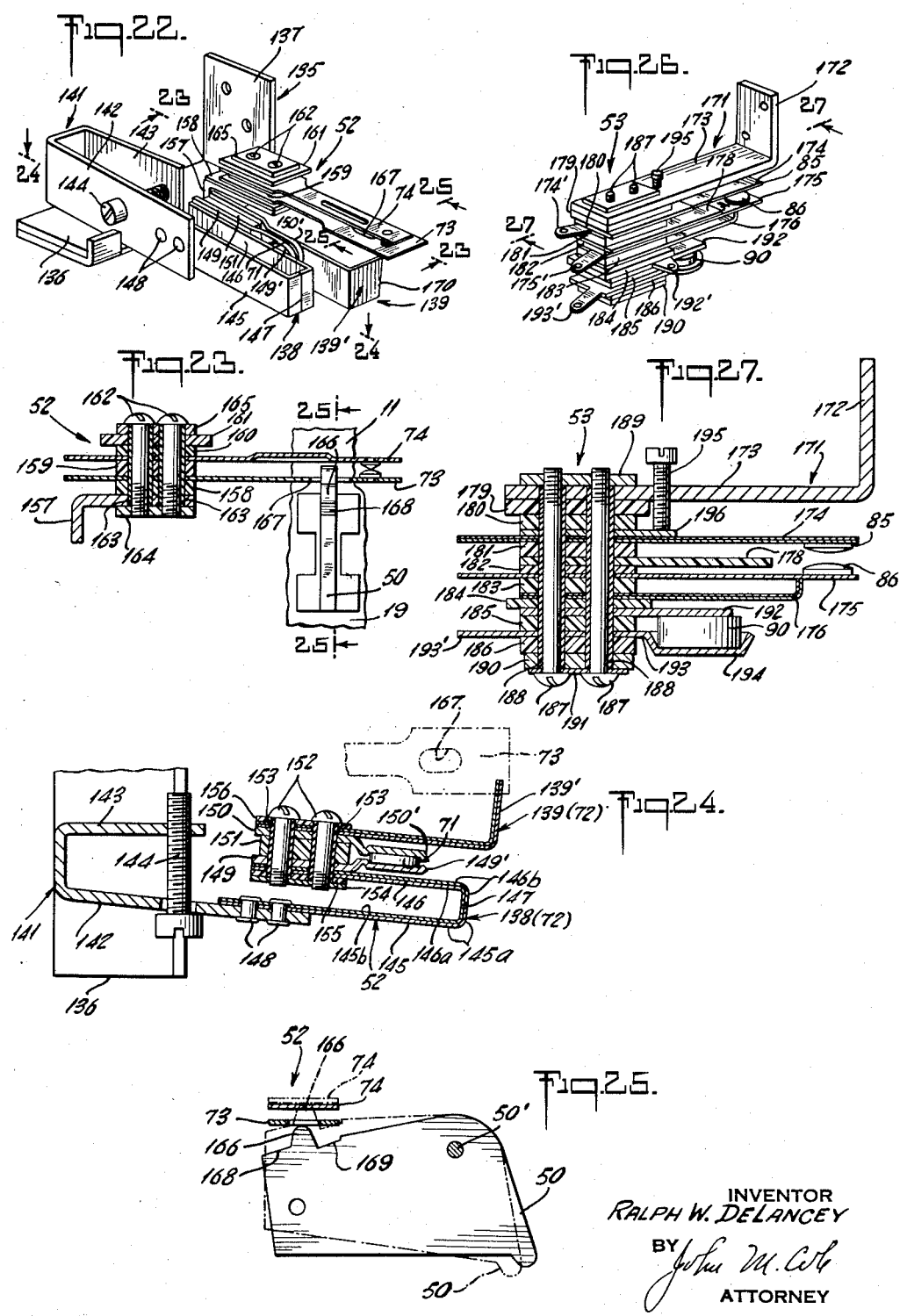

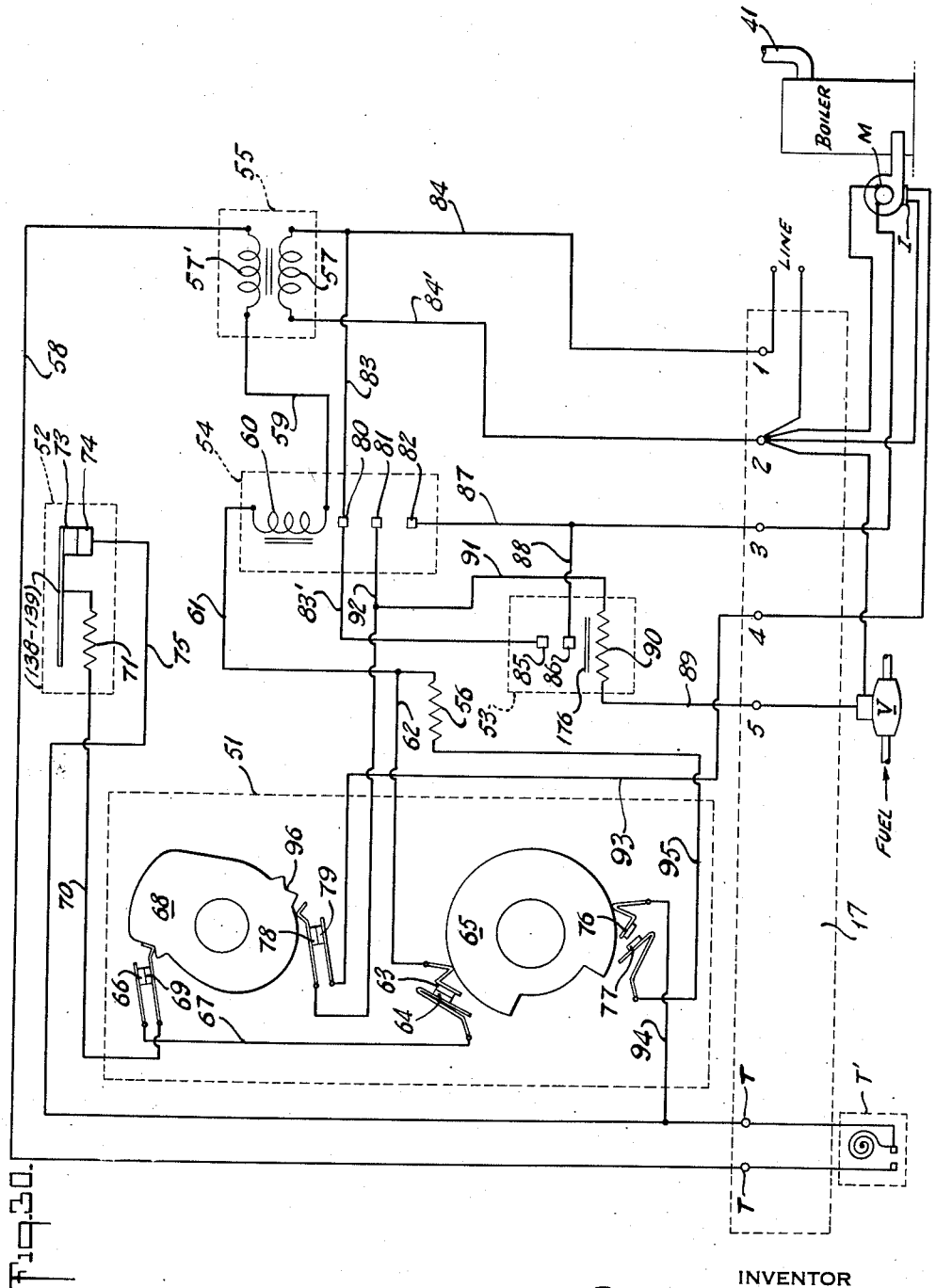

May 20, 1958   R. W. DE LANCEY   2,835,321
ELECTRIC CONTROL SYSTEM FOR FUEL BURNING EQUIPMENT
Filed Aug. 10, 1954   10 Sheets-Sheet 10
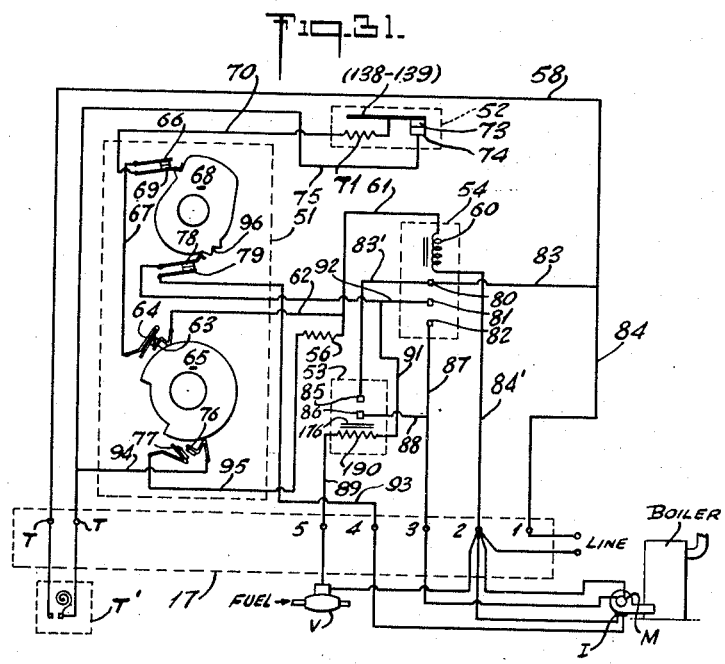
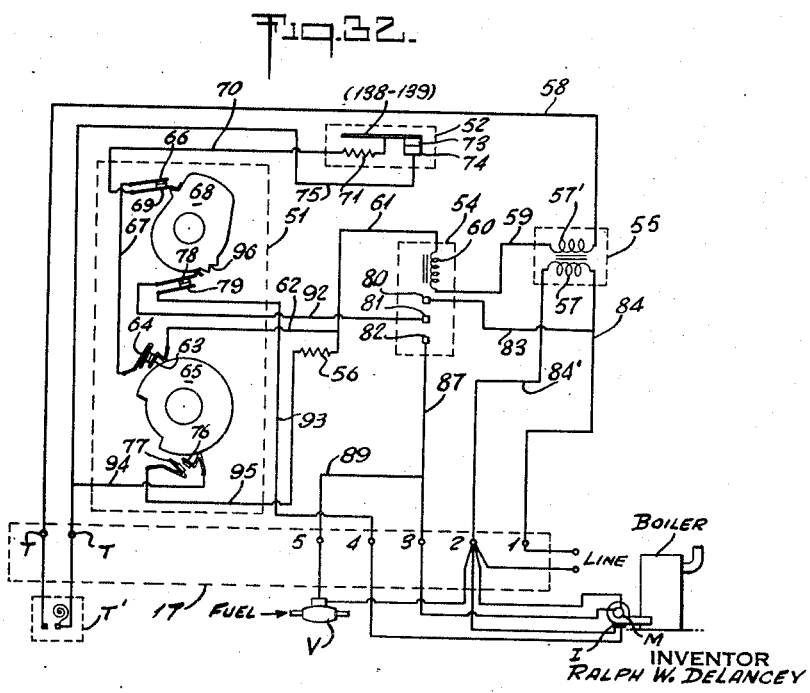
INVENTOR
RALPH W. DELANCEY
BY
ATTORNEY

United States Patent Office 2,835,321
Patented May 20, 1958

2,835,321

ELECTRIC CONTROL SYSTEM FOR FUEL BURNING EQUIPMENT

Ralph W. De Lancey, Des Plaines, Ill., assignor, by mesne assignments, to Controls Company of America, Schiller Park, Ill., a corporation of Delaware Application August 10, 1954, Serial No. 448,966

5 Claims. (Cl. 158—28)

This invention relates to electrical control devices and more particularly to an improved control device applicable for starting and controlling the operation of oil burning equipment as well as other electrical apparatus.

While this improved control device and system is generally adapted for use with oil burners for both commercial as well as residential installations and will be described in connection therewith, it will become apparent that certain of the new and improved components thereof as well as the control itself embody highly improved features and advantages, making them generally useful in the electrical field.

One of the controls for oil burning devices comprises the so-called stack, or primary control switch that is not only required to function to start and stop a burner in accordance with a demand for heat or hot water, but also operate to shut down the burner upon ignition, flame, or power failure or other improper functioning thereof. Present controls of this type have not been found to be entirely satisfactory for a number of reasons. For example, present controls are quite complex, which not only adds to the initial expense, but materially increases the cost and difficulty of maintenance and repair. Moreover the variety of operating conditions obtainable with a given device are limited in range, and inadequate provision is made to control the oil burning equipment to reduce smoke and the deposit of soot in the associated boiler or furnace, which of course greatly reduces the efficiency of the entire system.

These and other disadvantages and undesirable characteristics of present controls are overcome with the control in accordance with the invention which affords a relatively simple, highly dependable and versatile device.

Accordingly, one of the objects of the invention is the provision of a highly dependable, sensitive and accurate primary control device.

Another object of the invention is a new and improved primary control for oil burning equipment embodying means which respond immediately to improper burner operation, flame failure and extinguishment, power failure and the like, to stop the burner and prevent re-ignition until safe starting conditions have been re-established. This is very important in the case of so-called gun type or other burners which atomize the fuel to effect more effective and efficient burning.

Still another object of the invention resides in the improved circuit and circuit components which control the operation of the burner air injection or blower system independently of the fuel supply in order to prevent the generation of undue smoke on both start and stop. Such smoke not only creates a nuisance but deposits a substantial coating of oily carbon on the internal surfaces of the boiler or furnace, which functions as an insulator and reduces the efficiency of the system. It has been found that even small deposits of carbon in this way have been found to reduce boiler efficiencies of the order of 25%, which indicates the importance of smoke prevention especially in areas where fuel costs are relatively high. This independent control of air and oil is especially advantageous on low input (under 1 gallon per hour) atomizing burners because air flow is continued past the atomizing nozzle and functions to cool the nozzle and combustion chamber thereby preventing the cracking of residual oil and resultant clogging of the nozzle. It also permits the attainment of maximum air flow at the start before oil is admitted. As a result, during starting and stopping, smoke is virtually entirely eliminated and clogging of the nozzle is effectively prevented.

The accompanying drawings show for purposes of illustrating the present invention an embodiment in which the invention may take form, together with modified circuit diagram, it being understood that the drawings are illustrative of the invention rather than limiting the same.

In the drawings:

Figure 1 is a perspective view of one embodiment of the invention with the protective cover removed;

Figure 2 is a perspective view of the embodiment of Figure 1 illustrating the manner in which certain elements thereof may be removed;

Figure 3 is a cross sectional view of the bimetallic control element and associated operating structure forming part of the embodiment of Figure 1;

Figure 4 is an end view of the bimetallic element of Figure 3;

Figure 28:
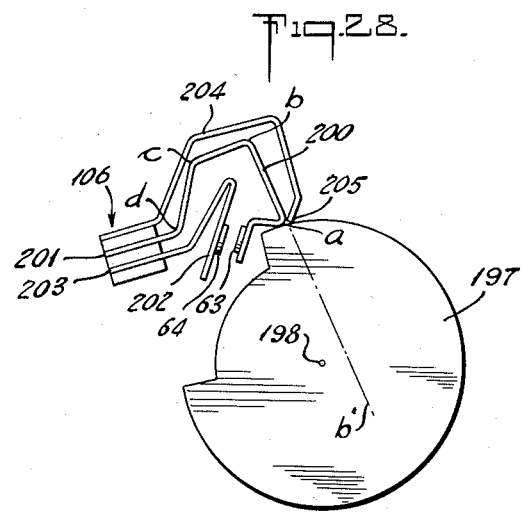
Figure 29:
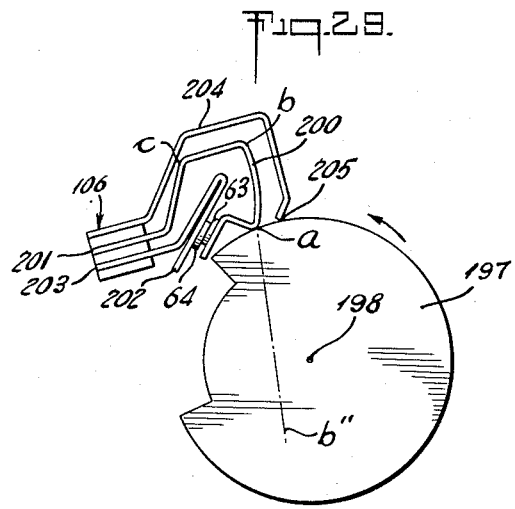

Figures 5 and 6 are cross sectional views of Figure 3 taken along the lines 5—5 and 6—6 thereof respectively;

Figure 7 is a rear elevational view of the control panel shown in Figure 2, the parts being shown in the run position;

Figure 8 is a cross sectional view of the control panel taken along the line 8—8 of Figures 1 and 7;

Figure 9 is an exploded view in perspective of the stack temperature responsive switch mechanism centrally located on the control panel as shown in Figures 7 and 8;

Figure 10 is a perspective view of the cam members of the switch shown in Figure 9 in a partially assembled condition;

Figure 11 is a cross sectional view of the cam switch mechanism as shown in Figures 7 and 8, taken along the line 11—11 of Figure 8;

Figure 12 is a cross sectional view of the partially assembled switch shown in Figure 11 and taken along the line 12—12 thereof;

Figures 13 to 21 are diagrammatic views of the contacts and contact operating elements of the switch mechanism of Figure 9 showing the sequence of operation of the contacts in the normal operation of the control;

Figure 22 is a perspective view of an improved lockout switch suitable for use with the present primary control apparatus and utilizing a negative temperature coefficient resistor for timing;

Figure 23 is a cross sectional view taken along the line 23—23 of Figure 22;

Figure 24 of a cross sectional view taken along the line 24—24 of Figures 7 and 22;

Figure 25 is a cross sectional view taken along the line 25—25 of Figures 7, 22 and 23 and showing the reset operation;

Figure 26 is a perspective view of an improved after run switch suitable for use in the present primary control apparatus and utilizing a negative temperature coefficient resistor for timing the after run;

Figure 27 is a cross sectional view taken along the line 27—27 of Figures 7 and 26;

Figures 28 and 29 are diagrammatic views illustrating one of the switches of Figure 9 at an enlarged scale;

Figure 30 is a circuit diagram of one form of control; and

Figures 31 and 32 are modified circuit diagrams.

*The general construction*

As pointed out, this invention will be specifically described in connection with its use as a stack or primary delay control for oil burning equipment, although certain aspects thereof are of general use, as will become evident as the description proceeds. Briefly, this new and improved control constitutes both a safety device as well as means for the control of the ignition and the supply of air and oil for an oil burner. It functions, for instance, to initiate the ignition and air supply when the system calls for heat. After the desired air delivery is established, it then operates to admit oil or other fuel. In this way a substantially smokeless start is effected. When the requirement for heat has been satisfied, the control cuts off the oil and then, after the nozzle and combustion chamber have cooled, the air supply is cut off and the burner is ready to be started again. This after-run period prevents the generation of undue smoke during the shut off period which normally contributes in large part to the soot deposited on the boiler or furnace surfaces. During the starting or operating intervals, the control functions to stop the burner upon failure of ignition, interruption of power, flame failure or momentary extinguishment for any reason whatsoever, so that it is impossible to restart the burner until safe starting conditions have been reestablished.

Referring now to Figures 1 and 2, the control comprises an outer case 10 of steel or other similar material. The case includes a back wall 11, side walls 12 and 13, top and bottom walls 14 and 15 and a cover 16. The side members 12 and 13 are cut back as indicated at 12' and 13' to provide a recessed mount for an insulating terminal plate or strip 17. The upper sections of the walls 12 and 13, together with the top wall 14 provide a compartment for reception of the control mechanism, denoted generally by the numeral 18. The mechanism has a front panel part 19 preferably of insulating material for supporting the elements and is secured in the case 10 by a pair of screws 20 cooperating with threaded openings 21 in lugs 22 which are bent inwardly of the walls 12 and 13. The panel 19 rests against the front edges of the walls 12 and 13 and is maintained in alignment by upstanding ears 23 cooperating with corresponding notches in the panel. The terminal strip 17 is secured in position in a manner similar to the panel 19 by means of a pair of screws 24. The entire unit is enclosed by the cover 16 which extends between the top and bottom walls 14 and 15 and has side walls extending to the rear wall 11. The cover may be held in position in any suitable manner, as by the screws and notches 25' and 26 respectively in the case 10 and cover 16.

The terminal strip has a plurality of power terminals denoted by the numbers 1 to 5 and low voltage or thermostat terminals T, T. These terminals provide for connection of the unit to the power supply, oil burner to be controlled and the room thermostat or other control device that is to indirectly control the operation of the oil burner. To couple the terminals on strip 17 to the control mechanism 18, each terminal is provided with a spring contact 27, Figure 8, extending slightly above the top edge of the strip 17. The control mechanism, on the other hand, includes corresponding cooperating terminal fingers 28 secured to a base member 29 of insulating material carried by and extending inwardly of the panel 19. In this way, the control mechanism upon insertion into its compartment is automatically coupled to the terminal strip 17 and in turn to the system it is to control. Moreover, the essentials of the external wiring circuit is preferably imprinted directly on the panel 19 to facilitate wiring in the control unit.

Should it be necessary to repair or replace the mechanism 18, the entire control and wiring need not be disturbed in its position in the system. Removal of the mechanism may be quickly and easily accomplished merely by removal of the dust cover 16 to expose the mechanism and then removal of the screws 20 to permit the mechanism to be removed from its compartment. This feature of avoiding actual disconnection of the wires attached to the terminal strip 17 and the removal of the entire assembly from the stack pipe, not only saves considerable time but avoids unnecessary replacement of parts.

Extending from the rear wall 11 of the case 10 is an elongated tubular member 30 which carries a spiral bimetallic element 31 on its outer end. The tube 30 is secured to the case 10 by three ears 32 extending through corresponding openings in the wall 11 and riveted, welded or otherwise secured in position. The bimetallic control element 31 is in turn fastened to the outer end of tube 30 by means of an outwardly extending ear 33 (Figure 3). The outer end 31' of the element 31 is bent inwardly as shown in Figure 4 and secured to a flat shaft 34 extending through the element 31 and tube 30. This shaft is held in free alignment with the tube by an opening 35' in the transverse bracket member 35 on the outer end of tube 30 and an aligning member 36 having three or more outwardly extending fingers that slidably engage the inner surface of the tube 30 at a point near the wall 11 of the case 10. The shaft 34 is loosely received in a flattened tube 37 having a flared mouth 37' which in turn is drivingly connected with the cam switch mechanism of the control in the manner to be described. The coupling between shafts 34 and 37 is loose to impede the transfer of heat therebetween for purposes that will be discussed as the description proceeds. In order to protect the case 10 from radiant heat, a heat baffle 38 of metal or insulating material may be spaced from and secured to the rear wall of case 10, as shown in Figures 1, 2 and 3. The tube 30 which carries the thermostat coil 31 from the case 10 is surrounded by a clamping sleeve 39 which is welded to a smoke pipe flange 40, so that when the flange is secured to such a pipe 41, the thermostat coil 31 is in the smoke pipe.

In order to facilitate wiring in of the control, the bottom wall 15 of the case 10 is provided with at least four openings 45 for BX cables 46a, b, c and d and cooperating cable connectors 48. In certain cases wherein unshielded thermostat wiring may be used, the cable 46d would not, of course, be provided with an armored shielding as illustrated.

The entire operation or resetting of the control is effected by two adjustments, namely the knob 49 for actuating a cam switch to insure proper operational sequence, especially on new installations and a reset button 50. The purpose of these adjustments will be described in connection with the detailed description of the associated components.

The layout of the several components carried by the panel 19 and constituting the control mechanism 18 is illustrated in Figures 7 and 8 of the drawings, and one of the wiring diagrams in Figure 30. This control broadly comprises five basic elements, namely, the cam operated sequence switch 51 (shown in detail in Figures 9–21), lock-out and reset switch 52 (shown in Figures 22–25), motor-after-run switch 53 (shown in Figures 26–27), relay 54, transformer 55 and resistor 56. While the transformer, resistor and relay constitute essential elements, their structure is conventional and will not therefore be described in detail.

The sequence switch 51 is actuated by the spiral bimetallic element 31 and functions to control the starting and stopping sequences of the oil burner operation as well as to effect immediate shut down on ignition, power or flame failure. The lock-out and reset switch 52 cooperates with the circuits of the cam switch 51 to lock out the control on ignition failure or flame failure so that the burner cannot be started until manual actuation of the knob or button 50, as shown in Figure 8, which forms part of this switch. The motor-after-run switch 53 determines the period of operation of the motor and blower of the oil burner after the oil supply is interrupted on shut off to prevent undue after smoke, cool the fire box and cool the nozzle to prevent deposition of carbon and resultant clogging of the nozzle. The function of the relay, transformer and resistor will become apparent as the description proceeds.

*The circuit diagram*

Reference is now made to the circuit diagram of Figure 30 wherein the electrical relationship of the various components is illustrated. The same reference characters for the circuit diagram are used for corresponding parts in the structure drawings. In Figure 30 the individul component parts are enclosed by dotted outlines and are identified by the same numerals used in connection with other figures.

The terminal strip 17 carries the terminals 1 to 5 inclusive and two terminals labeled T, T for attachment of a thermostat T' or other controlling device, as above described. An alternating current power source is connected to terminals 1 and 2 and is then supplied by way of the control to the oil burner motor M through terminals 3 and 2, to the ignition means I through terminals 4 and 2, and to the oil control valve V by means of terminals 5 and 2. Low voltage for control is obtained by means of the transformer 55 which has a primary winding 57 connected within the unit by leads 84 and 84' with the line terminals 1 and 2, and a secondary winding 57'.

The thermostat circuit which initiates operation of the burner includes the winding 57' of transformer 55, one side of which is connected through the lead 58 to one of the terminals T. The other side of winding 57' is connected through the lead 59 to one side of the coil 60 of relay 54. The other side of that coil is connected through leads 61 and 62 to movable contact 63 opposite fixed contact 64 and associated with cam 65 of switch 51. Contact 64 is connected to fixed contact 66 by a lead 67. This contact is adjacent cam 68, also part of switch 51 and cooperates with contact 69 by means of lead 70 and a negative temperature coefficient resistor 71 to the temperature responsive structure including the bimetallic elements 138 and 139 of the reset switch 52. Contacting means 73 is electrically coupled to the bimetallic elements 138 and 139 and its cooperating contacting means 74 is connected to the other thermostat terminal T by means of the lead 75. When the terminals T and T are not connected by the thermostat and the entire control is at rest, contacts 63—64 and 66—69 on cam switch 51 are closed and contacting means 73—74 on reset switch 52 are also closed. At the same time, contacts 76—77 opposite cam 65 are open while the contacts 78—79 are closed. For a more accurate disposition of cams 65 and 68 and their associated contacts, reference is made to Figure 13, showing the position thereof when the control is ready to start an oil burner.

Now, assuming that a demand for heat is created, switch T' connected with contacts T—T will be closed and this completes the starting circuit to operate relay 54 and close the three contacts 80, 81 and 82, one to the other. Contact 80 is connected by means of leads 83 and 84 to power line terminal 1. This contact is also connected by lead 83' to contact 85 of the contacts 85, 86 of the motor-after-run control 53. The relay contact 82 is connected to terminal 3 by lead 87 and also to contact 86 of motor control 53 by the lead 88. With this arrangement, closure of the relay contacts energizes the motor M which is connected to terminals 3 and 2. Although the motor on a conventional oil burner drives both the oil pump as well as the blower, this system presupposes the use of a separate oil valve in the fuel line in order to permit initiation of the flow of air on starting but delay the supply of oil. In so doing, the motor will have time to develop appreciable air flow before injection of the fuel. The oil valve receives energy from terminals 5 and 2 at the same time the motor is started. As terminal 5 is connected to the contact 81 of relay 54 through the lead 89, a negative temperature coefficient resistor 90 of the motor-after-run control 54, and leads 91 and 92, and as the resistor 90 has a high value when cold, actuation of relay 54 as described will initially permit current flow too small to actuate the valve and cause it to open and allow fuel to flow. However, after a short period of time, when the motor has attained substantially maximum speed and established air flow, the resistor 90 heats and its resistance lowers to a point permitting the flow of sufficient current for actuation of the oil valve. Since the air flow with this arrangement is built up to substantially maximum flow before the admission of oil, smoke conditions on starting are substantially entirely eliminated. Only a relatively short delay is required for this purpose and, because of the sensitivity and stability of the control, the precise value thereof is not critical. Accumulated heat from resistor 90 causes bimetal element 176 (see Figure 27) to close the motor-after-run circuit through contacts 85 and 86 and bypass contacts 80 and 82.

In addition to starting the motor M and energizing the oil valve V on starting, the ignition circuit of the oil burner was also energized inasmuch as the contacts 78, 79 of switch 51 were closed at the time the relay 54 was operated by the thermostat connected to terminals T, T. The ignition circuit within the control includes contact 81 of relay 54, lead 92, contacts 78, 79 and lead 93 to terminal 4.

Assuming at this point that the burner ignites properly and that no undesirable conditions arise, the burner will cause the bimetallic coil 31 disposed within the stack 41 to become heated and begin to expand or unwind. This will cause clockwise rotation of the shaft 34 as viewed from the rear and move cams 65 and 68 (Figures 13 and 30) clockwise. This movement initially affects only cam 65, as illustrated in Figure 14, which is free to move through a predetermined angle relative to cam 68. The purpose for this coupling will become evident in part from the description of the circuit and in part from the subsequent description of the mechanical aspects of the switch.

This initial movement of cam 65 closes contacts 76, 77 and completes a bypass circuit, including wires 94, 95 and resistor 56 about the contacts 63, 64 and 66, 69 of switch 51 and contacts 73, 74 of the reset switch 52. While this circuit prevents a lock-out condition on opening of the contacts 63, 64, it may be desirable under certain conditions to retain the reset switch in the relay control circuit and at the same time realize other essential features of the invention.

The next step (see also Figure 15) in the operation of this control consists of further clockwise rotation of cam 65 while cam 68 still remains stationary. This action opens the contacts 63, 64 and introduces the resistor 56 into the circuit, thereby reducing the current through the relay coil. The value of this reduced current, however, is such that the relay will stay closed as described, but, should a power interruption be experienced, the relay 54, upon being even momentarily deenergized, will not pull in again until after the switch 51 is recycled to the start position. The employment of resistor 56 constitutes but one procedure to insure deenergizing of the relay 60 to permit re-energization in the event of power failure and momentary flame failure until safe starting conditions have been reestablished.

Transferring from the start to the run position is an important factor in preventing false lockouts. Prior controls have required temperature changes of the order of 200° or more for the attainment of this end so that a lock-out could occur after a normally satisfactory start has been effected but wherein the heat generated has failed to act on the bimetal within the required time. With the cam switch in accordance with the invention this changeover to the run position can be attained with a temperature change of less than 100° readily produced on a satisfactory start. This temperature change can thus be sensed in such a short time that false lock-outs are effectively prevented.

As the clockwise motion continues (see also Figure 16), cam 65 starts the rotation of cam 68 to open contacts 66–69 to prevent closure of the initial starting circuit until such time as the cams 65 and 68 are ultimately returned to the starting position after the oil burner has been turned off. Continued heating of the bimetallic element 31 produces continued rotation of cams 65 and 68 which brings the contact 78 into engagement with the notch 96 of cam 68. Further movement of cam 68 causes the contact 78 to ride past notch 96, whereupon cam 68, by reason of the loose coupling between it and cam 65 will snap forward as shown in the dotted line position of Figure 17. Contacts 78—79 will now snap open and break the ignition circuit previously described.

Figure 18:
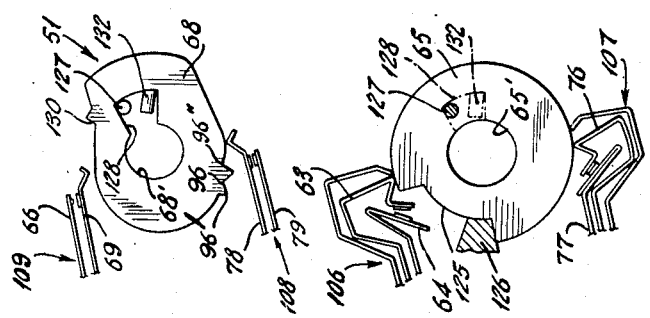

The final run position of the cams and contacts is shown in Figure 18. At this point, the control is in the "run" position and the oil burner will continue until the demand for heat has been satisfied. When this occurs the connection between the terminals T—T is broken, the relay 60 is deenergized, and the control is prepared to turn off the burner. Deenergizing of the relay 60 opens the contacts 80, 81, 82 which breaks the oil valve circuit and shuts off the fuel. The circuit for the motor M is not broken, for the contacts 85, 86 of the motor after run control 53 had been closed by the bimetallic strip 176 heated by the resistor 99. Upon opening of the relay contacts 80, 81, 82, the motor will continue to run until the bimetallic element 176 of control 53 cools sufficiently to permit contacts 85—86 to open. In so doing, the motor and blower continue to run after the fuel flow has been interrupted. This cools the burner nozzle and furnace fire box and avoids the commonly experienced re-radiation from the fire box walls onto the nozzle which often heats the nozzle to such high temperatures as to permit the accumulation of carbonaceous residues on the nozzle. With the present device the oil emitted from the nozzle and oil vapors in the fire box are completely burned without after smoke.

Figure 21:
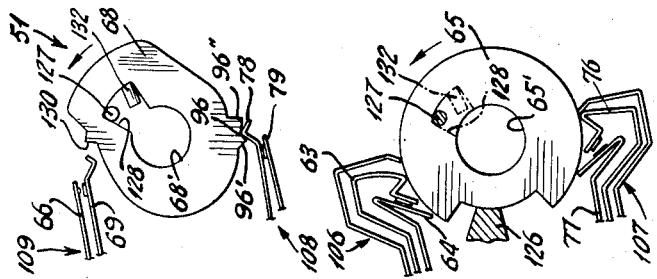
Figure 19:
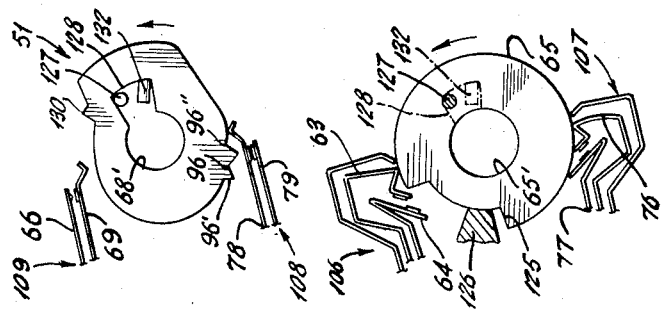

With the burner turned off, the bimetallic element 31 in the stack will start to cool and effect counterclockwise rotation of the cams 65 and 68, as viewed in Figure 19. On this return, contacts 76—77 first open to break the circuit to resistor 56. This opening is a safety feature which does not affect ordinary operation. Then contacts 63—64 close (Figure 20) and contacts 78, 79 close, as illustrated in Figure 21. Finally the cams return completely to the start position, as shown in Figure 13, with contacts 66—69 being the last to close for reestablishment of the starting circuit. Contacts 76—77 forming the lock-out circuit or reset switch by-pass are, of course, in the open condition.

As was evident from the description of the circuit diagram above, the cam switch 51 actuated by the bimetallic element 31 functions to control the sequence of operations to turn the burner on and to turn it off when the requirement for heat has been satisfied. In addition to controlling the sequence of operations, this switch is designed and arranged to prevent the occurrence of false lockouts occasioned by failure of the control to bypass the reset switch 52 substantially immediately upon ignition of the fuel. Another important aspect of this cam switch resides in the provision of means for regulating the ignition "on" time to meet the varied requirements of oil burning equipment.

Another important aspect of the foregoing circuit resides in the utilization of means for preventing reestablishment of the ignition circuit upon flame extinguishment by reason of water or air in the fuel line, power failure or the like. In the present embodiment of the invention this is attained through the cooperation of contact 76 and 77 with cam 65.

In addition, in this improved stack control circuit the reset switch can "lock-out" only during the starting period and by reason of an improper start. At all other times improper operation will cause the cam switch to be recycled to the start position whereupon the burner is automatically restarted.

*The cam switch*

The cam switch 51 is, as above referred to, operated by the bimetallic coil 31 in the smoke pipe and is as shown in Figures 8–12. It has a body member 98 secured to the rear of panel 19. The body member has two bifurcations 99 and 100 with holes 99' and 100' in line with the flattened strip 34 operated by the coil 31. The flattened tube or coupler 37 above referred to is secured to a flattened shaft 97 carrying cams 65 and 68 and extending through holes 99' and 100' and an opening in the front of panel 19 where it is secured to the knob 49.

The body 98 carries switch assemblies 106 (contacts 63 and 64) and 107 (contacts 76 and 77) for cooperation with cam 65. It also carries switch assembly 108 (contacts 78 and 79) and switch assembly 109 (contacts 66 and 69) for cooperation with cam 68. Engagement of the shaft 97 with the cams 65 and 68 is accomplished by a cylindrical member or bushing 103 between the arms 99 and 100. This bushing has a hub portion 112 which in turn carries a rigid clutch element 104, a clutch spring 105 and the cams 65 and 68 and has, at the far end as viewed in Figure 9, an annular flange 113. On the near side of the portion 112 is a section 114 of smaller diameter for engagement with cam 68 and having an annular groove 115 beyond this cam.

The clutch assembly 104 and 105 engages the cylindrical part 112 of hub 103 and rides against the flange 113. Member 104 of the clutch comprises a pair of spaced, washer-like members 117 and 118 which are fixed one relative to the other by a bridging bracket member 119 preferably formed integrally with members 117 and 118. Parallel to the bridging bracket is an adjustable member 120 movable toward and away from bracket 119 to adjust the frictional engagement of clutch spring 105 with the surface 112 of member 103. This spring is positioned between the washer like members 117 and 118 with the ends 121 and 122 thereof disposed on the outer sides of members 119 and 120, as shown in Figure 12. With this arrangement rotation of the drive member 103 will rotate the clutch 104—105 through the friction of spring 105 on surface 112 and the amount of friction can be readily varied by adjusting the spacing of members 119 and 120 disposed between the outer clutch members 117 and 118 (see Figure 12). By moving the member 120 away from the member 119 for instance, the ends 121 and 122 of spring 105 will be separated to decrease the frictional engagement while movement of member 120 closer to member 119 will close the ends of the spring and increase the frictional engagement.

Cam 65 has a central concentric opening 65' proportioned to slidably engage the cylindrical surface 112 of the drive member 103 and is provided with a pair of openings 124 to receive a pair of outwardly extending lugs 123 formed integrally with the clutch 117. Rotation of the cam 65 and clutch part 104 on the bushing 103 is limited by a notch 125 and a cooperating stop 126 carried by the body 98 and shown in Figure 7 of the drawings.

This rotation of the shaft 97 and drive member 103 beyond that angular range will merely cause the drive member or hub 103 to slip relative to the cam 65. Furthermore, the cam 65 is immediately responsive to changes in direction of movement of hub 103 so that the switch as a unit will operate not in response to absolute motion of hub 103 and member 31 as determined, for instance, by absolute temperatures of the stack 41, but rather in response to a change in direction of motion. For instance, let it be assumed that the switch will go through its entire sequence of operations in response to a change of temperature of about 80° F. Now, regardless of the stack temperature, should the system call for heat, the control will initiate operation of the oil burner and the switch will function on the initial rotation of hub 103, which it is assumed corresponds to 80° F. change in temperature. Similarly the initial 80° F. drop in stack temperature when the burner is being turned off will recycle the switch to its off or restart position. This provides more effective and efficient operation because there is no requirement, for instance, that the stack attain a predetermined minimum temperature before the burner can be restarted. Cam 68 can turn on the section 140 and hub 103 and is retained in position by a spring clip 129 which engages the groove 115 thereof. It is driven by the cam 65 through a pin 127 carried by cam 65 and a cooperating arcuate slot 128 formed in the body of cam 68 and opening into the central opening 68′. The angular length of this slot 128 determines the movement of cam 65 before it in turn moves cam 68 as when going from an "off" position through clockwise motion as viewed in Figures 9 and 10 to the "on" position. This action is illustrated in Figures 13, 14 and 15, previously described. The assembled view of the cam elements and clutch is seen in Figure 10.

The relative motion between cams 65 and 68 afforded by the pin and slot drive means is used to control the ignition "on" time. This ignition is controlled by the ignition switch assembly 108, of which contact members 78 and 79 form a part, and are closed in the start position of the switch 51. The V shaped end of contact member 69 is positioned beyond the projection 130 of cam 68 and prevents rotation of the cam until the pin 127 of cam 65 exerts a positive force to move it clockwise (see Figures 13 through 16 showing the sequence of cam positions as the burner is turned on). While the ignition contacts 78 and 79 are not opened until cam 68 is moved to this "run" position (Figure 18), this delay results in longer ignition time and is made adjustable by a screw 131 having an offset or eccentric pin 132. Screw 131 threadably engages a substantially radial opening 133 through the cam 68 and is rotatable to move the pin 132 in a manner to vary the lost motion of the pin 127 in slot 128 and hence the play between the cams. This in turn controls the point in the "on" cycle of switch 51 at which the ignition contacts 76 and 77 will be opened to cut off the burner ignition. During the heating of the coil 31 in the smoke pipe the cams 65 and 68 are driven clockwise by the clutch and by pin 127 and 132, and the cam 65 has been brought adjacent stop 126 (Figures 13–17). The V-shaped nose of contact 78 has passed by the first tooth 96′ of cam 68 and dropped into notch 96 keeping the circuit closed and has finally climbed over the second tooth 96″ in the cam 68. The end of contact 78 thereupon rides down this tooth 96″, opens the circuit by snap action and causes the cam 68 to shift as shown in dotted lines in Figure 17 or the full line position of Figure 18. This brings pin 127 against the back face of slot 128 and sets the cams in position for the shut down operation of Figures 18–21.

When the completely assembled mechanism 18 is initially placed in position the shafts 97 and 34 are brought into alignment by turning the knob 49 until tube 37 accepts shaft 34. To insure that the contacts of sequence switch 51 all face the proper way, the knob 49 is turned counterclockwise from the front so as to tension the bimetal coil. The coil then drives the cams in the other direction, simulating a burner shut down operation and restores the contact to the position of Figure 13.

Reset switch

The new and improved reset switch 52 which functions as a safety switch to break the primary starting circuit upon failure of the fuel to ignite within a predetermined period of time is shown in Figs. 22 through 25, inclusive. This switch comprises a base member 135 in the form of an angle bracket secured to plate 19, having an outwardly extending leg part 136 and a mounting leg part 137. The bracket part 136 supports the elements of the switch, including the bimetallic elements 138 and 139 of part 72, and the contact members 73 and 74. The bimetallic elements which form a separate sub-assembly along with a negative temperature coefficient resistor 71 are adjustably supported by one leg 142 of a U-shaped bracket 141. The opposing leg 143 of this bracket is secured to the supporting member or bracket 136 as by welding or other suitable means. The legs 142 and 143 of the U-shaped member 141 are adjustable relative one to the other by means of a screw 144 passing through an opening in leg 142 and threaded into the leg 143.

The bimetallic member 138 is of composite structure and formed of two separate L-shaped pieces 145 and 146 welded or joined one to the other at 147 in the form of a U. In addition to the joinder of these bimetallic elements to form a unitary structure, they are reversely arranged to compensate for variations in ambient temperature. This is attained by joining the elements so that the layer 145b of element 145 abuts the corresponding layer 146a of element 146 at the joint 147 and the layer 145a abuts layer 146b. In this way, the elements 145 and 146 will deflect with ambient changes in temperature so that the free end of element 146 will remain substantially stationary. The end of element 145 is permanently coupled to leg 142 of bracket 141 by a pair of rivets 148 or other suitable means.

The end 146 of the element 138 carries the resistor 71 and bimetallic element 139. The resistor 71 which has a negative temperature coefficient is retained between a pair of retaining members 149 and 150. They are formed of electrically conductive material which has circular cup-like portions 149′ and 150′ for retaining the disc-like resistor 71. The member 149 lies flat against and is electrically coupled to the end 146 of the bimetallic element 138. The other member 150 lies flat against one end of the bimetallic element 139 and the members are separated by an insulating spacer 151 of a thickness that will produce the desired pressure of the cup-like parts 149′ and 150′ against resistor 71. The entire assembly is held together by a pair of screws 152 insulated by substantially coextensive bushings 153 and threaded into a small metal plate 154. The plate 154 is also insulated from element 146 by an insulating spacer 155 and another insulating spacer 156 is positioned between the heads of screws 152 and element 139. In this way an electrical circuit is established from the bracket 137 to the V-shaped member 141, then through bimetallic members 145 and 146, bracket 149, resistor 71, bracket 150 and bimetallic element 139.

The contacts 73 and 74 and supporting structure 157 therefor shown in Figure 23 are also mounted on the leg 136 of mounting bracket 135 and are positioned for cooperation with the angled end 139′ of the bimetallic element 139. The contact members or springs 73 and 74 are insulated from the bracket and from each other by insulated spacers 158, 159, 160 and 161, and the assembly is held together by a pair of screws 162 extending through the insulating bushings 163 and threaded into a plate 164 underlying bracket 157. If desired, a plate 165 may be interposed between the heads of screws 162 and the insulating spacer 161.

In the normal position of the bimetallic elements 138 and 139, the end 139′ of element 139 extends beneath the tensioned spring contact member 73 which bears against it to establish an electric circuit. In this position, the contact member 74 also contacts the member 73 so that a closed circuit is set up between contact member 74 and the mounting bracket 135.

The contact members 73 and 74 are arranged to be operated or reset by the button 50 which is pivoted about an axis 50' to the front panel 19 as shown in Fig. 2. This button functions as a bell crank and has on its inner end an upwardly extending pin 166 which is adapted to extend through an opening 167 in contact member 73 and bear against the contact member 74. The length of the pin 166 is sufficient to break the contact between members 73 and 74 before the shoulders 168 and 169 of the button 50 adjacent the pin 166 operate to lift the contact member 73.

In operation, the contacting members 73 and 74 are normally closed so that a circuit is established as described from bracket 137 to contact member 74. Applying this structure to the circuit diagram of Fig. 30 previously described, the bracket 137 would be connected to the contact 69 of cam 68 while contact 74 is connected to one of the thermostat terminals T. Assuming now that the terminals T and T have been shorted to start the burner, a current will flow through the reset switch 51 and the negative temperature coefficient resistor 71. When cold, this resistor has a high resistance and it begins to heat by reason of the current drawn by relay 54. The heat thus generated starts to heat bimetallic elements 146 and 139 causing them to warp and begin to withdraw the end 139' of element 139 from beneath the contact 73. If the burner for any reason fails to ignite, the cams 65 and 68 will not be rotated by the bimetallic element 31 and resistor 71 will continue to heat. As its resistance goes down, heating will continue and cause sufficient warping of bimetallic elements 146 and 139 to withdraw the end 139' completely from beneath contact 73. Contacts 73 and 74 will open, deenergize the relay 54 and turn off the burner. With the circuit through resistor 71 now broken, it will cool and the bimetallic elements 14 and 139 will return toward their normal positions. Contact member 73, however, prevents the return as the sloping edge 170 of member 139 now engages the edge of contact member 73 and is firmly held back. Before the burner can be restarted, the button 50 must be manually depressed and, upon so doing, both contacts 73 and 74 are raised in an open position by the pin 166 and shoulders 168 and 169 until the contact 73 is free of edge 170. The bimetallic members 138 and 139 then spring toward the contact member 73 so that the end 139' of element 139 again underlies the contact 73. Upon release of button 50, the contacts 73 and 74 will rest in a closed position on the bimetallic member 139. The position of the bimetallic member 139 relative to the contacts 73 and 74 is adjustable by screw 144 in the manner described, and this of course determines the time in which the switch will function to turn off the burner on failure to ignite.

*Motor-after-run switch*

The motor-after-run switch 53 is illustrated in Figs. 26 and 27 and also embodies a negative temperature coefficient resistor and ambient temperature compensation. This switch is supported on the control panel 19 by an angle bracket 171 having a mounting leg 172 and a switch supporting leg 173. The contacts 85 and 86 above referred to are carried respectively by a bimetallic strip 174 and a leaf spring 175 of Phosphor bronze or the like. Movement of contact 86 and spring 175 is effected by an L-shaped bimetallic element 176 which is heated by a negative temperature coefficient resistor 90. A heat baffle 178 is disposed between the bimetal element 174 and contact spring 175 to shield the element 174 from the heat generated by resistor 90 when it functions to heat the element 176 and cause contacts 85 and 86 to close.

These elements of the motor-after-run switch are held in predetermined spaced relationship by a plurality of insulating spacers 179 to 186 and a pair of screws 187 extending through insulating bushings 188 and threaded into a plate 189 on the back side of the mounting bracket 171. In order to prevent damage to insulator 186, metal plates 190 and 191 may be interposed between the heads of screws 187 and insulator 186 as illustrated.

The negative temperature coefficient resistor 90 is held in close proximity to the bimetallic element 176 by a pair of flat electrically conductive spring members 192 and 193 having terminals 192' and 193', respectively, for connection to a circuit. The member 193 includes a cup-like part 194 for retention of resistor 90. The contact carrying members 174 and 175 terminate in terminals 174' and 175' for connection to an electric circuit. The member 175 is sprung backwardly to rest against and follow the movement of the bimetallic element 176. The bimetallic elements 176 and 174 are arranged to move in the same direction with changes in ambient temperature so that the spacing between contacts 85 and 86 normally remains the same. Upon heating, element 176 shifts relatively to the element 174 to close the contacts. The spacing between contacts 85 and 86 is adjustable by means of a screw 195 threaded in a cooperating opening in bracket part 173 and bearing against the plate 196 which in turn lies against the root end of the bimetallic contact carrying member 174.

This switch as set forth above embodies means for ambient temperature correction, adjustment of the contacts and in addition may simultaneously function to control the operation of an external circuit by means of the negative temperature coefficient resistor. For instance, this resistor may be used to provide delayed operation of the oil valve or other equipment as may be desired and as described in connection with the circuit diagram of Fig. 30. Thus, the resistor has a dual function which greatly simplifies the apparatus as a whole and provides a highly dependable control means having application even apart from its important use in connection with the oil burner control herein described.

Figures 28 and 29 show diagrammatically and in enlarged form the structure of the contact assembly 106 (or 107) of the sequence switch 51 and the cooperation of the contacts of this assembly with the circular, cylindrical surface of cam member 65. In these figures, the cam 65 is represented diagrammatically by a circle 197, centered at 198.

Figure 20:
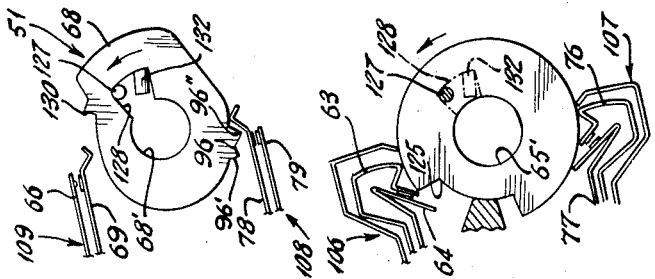

The contact 63 is carried on the free end of a yieldable sheet metal spring member 200 with its fixed end anchored at 201. This spring member has a relatively sharp, knee or V-shaped portion (*a*) biased toward the center of the cam by the inherently yieldable material used. It also has an outwardly extending portion *a—b* and bent portions *b—c* and *c—d* which make it possible for the spring member 200 to be partially collapsed or expanded due to frictional engagement of the knee (*a*) with the disk. The line of thrust is indicated by the line *a—b'* to the right of center 198. This movement can take place to the right or left, depending upon the direction of motion of the disk. The relatively fixed contact 64 is carried on a sharply bent yieldable spring member 202 anchored as indicated at 203. The assembly 106 also includes a relatively rigid metal strap 204 which extends around the spring 201 and has its end 205 preferably lightly bearing against the surface of the disk 197 to provide a friction drag. It is normally in such a position that when the disk 197 turns clockwise, it forms a back-stop for the spring member 200 so that the spring member 200 is never free to escape to the right and always presses against the disk 197 with residual force. When the disk 197 (cam 65) turns counterclockwise from the position shown in Figure 28 to that in Figure 29, the knee (*a*) of the spring 200 is pushed to the left, distorting the spring 200 so as to bring the angled portions a—b, b—c and c—d closer together and the contact 63 against the contact 64. The line of thrust is now to the left of center 198, as indicated in Fig. 20 by the line a—b". Continued movement after the contacts have closed the circuit merely causes the cam surface to pass under the knee (a) of the spring 200, thereby maintaining contact pressure. The closing of the circuit has also effected a wiping action between the contacts 63 and 64. Mere stopping of the disk has no effect on the circuit.

On reverse angular movement of the disk 197 (cam 65), the frictional engagement of the knee of the spring 200 with the surface of the cam member is sufficient to carry the spring member in a clockwise direction (Figures 28 and 29), deforming the spring 200 somewhat so that it is drawn back against the stop 205. During this movement, the switch is opened.

While only one embodiment of the invention has been illustrated, its versatility and adaptability to varied conditions is in part illustrated by the circuit diagrams shown in Figures 31 and 32. In these figures elements corresponding to elements of Figure 30 are denoted by like numerals.

Referring first to Figure 31, there is illustrated a so-called line voltage stack control switch that will function equally well on both D. C. and A. C. and at any desired voltage with suitably designed components. In this circuit, the transformer 55 is omitted and the thermostat lead 58 is connected directly to terminal 1 on the terminal strip 17. Similarly the bottom terminal of relay winding 60 is connected through lead 59 to terminal 2 on the strip 17. Since the line voltage connected to terminals 1 and 2 will be of the order of 120 volts, the relay coil 60 must be modified to function at the higher voltage and it may be desirable to increase the resistance of resistors 56 and 71 since the higher voltage relay will probably operate at a lower current.

It will be observed that notwithstanding this modification of Figure 30 to provide a line voltage stack switch, the basic elements and mode of operation remains the same.

In certain oil burner installations it may be desirable to eliminate the motor-after-run feature illustrated in Figure 30 so that the oil supply and blower are turned on and off at the same time. In these cases, the motor-after-run switch 53 is eliminated together with the connecting wires 83', 88 and 91, and the terminal 5 on strip 17 is connected directly to the terminal 3. In this way the oil burner motor M and valve V are deenergized and energized simultaneously by the relay 54 as described in connection with Figure 30. Many oil burners do not provide separate fuel valves V, in which case the terminal 5 may be disregarded and if desired eliminated from the strip 17. The operation of this modified circuit is in every way identical to Figure 30, except for the motor-after-run feature.

The foregoing modifications have been included to illustrate the usefulness of the invention in a wide variety of applications, including both household and commercial installation, it being understood that other modifications, alterations and changes may of course be made without departing from the true scope and spirit thereof as defined in the appended claims.

I claim:

1. Apparatus for controlling the operation of heating equipment having an oil valve, ignition means and a motor, comprising a bimetallic element adapted to respond to heat generated by said equipment, a sequence cam switch including a disk and at least three sets of contacts actuated by said disk with said disk coupled with said bimetallic element for mechanical actuation thereby, a relay including a coil and at least one set of normally open contacts, a plurality of terminals adapted for connection of said apparatus to a source of energy and said heating equipment including a pair of terminals for connection to external switch means for controlling said apparatus and in turn the heating equipment, a reset switch having normally closed contacts and including a bimetallic element and heater therefor to actuate said switch, a starting circuit including at least one normally closed set of said cam switch contacts, said relay coil, said external switch terminals, said power source terminals and said reset switch heater and contacts for energizing said relay in response to closure of said external switch, an ignition circuit including a second set of normally closed cam switch contacts, said relay contacts and said power source terminals to energize said ignition means, means including said power source terminals and said relay contacts adapted for energizing said motor, a motor-after-run switch having normally open contacts including a bimetallic element and heater therefor, an oil valve circuit including said power source terminals, said motor-after-run heater, and said relay contacts for actuating said oil valve, a shunt circuit including a third normally open set of cam switch contacts, a resistor, said relay coil, said external switch terminals and said power source terminals for shunting said reset switch, and a motor-after-run circuit including said motor-after-run switch contacts and said power source terminals adapted for energizing said motor, said relay adapted to function on closure of said external switch to energize said motor and ignition means and open said oil valve whereupon generation of heat functions to actuate the cam switch to complete said shunt circuit and shunt said reset switch and open the ignition circuit, said relay further adapted to function on opening of said external switch to deenergize the circuit associated with the contacts of said relay, said motor continuing to operate until said motor-after-run heater cools allowing the motor-after-run heater contacts to open.

2. Apparatus according to claim 1 wherein said reset switch heater and said motor-after-run heater have negative temperature coefficient resistors with said motor-after-run heater functioning to delay the actuation of said oil valve a short time after said motor is started.

3. Apparatus according to claim 1 wherein said heaters have a negative temperature coefficient of resistance and said sequence cam switch includes means for adjusting the period of operation of said ignition means.

4. An electric control for a fuel burner comprising, a motor operated blower, an electric fuel valve, a first circuit including a negative temperature coefficient resistor and said electric valve, means for simultaneously energizing said motor and said first circuit to start said motor and to open said valve a short period of time after the motor is started due to the time interval required to heat said resistor to a point where it passes sufficient current to open said valve, a second circuit including a normally open thermostatic switch and said motor connected in series, means for deenergizing said first circuit, said switch disposed adjacent said resistor and heated thereby to close the switch and to maintain motor operation after said first circuit is deenergized until said switch cools sufficiently to open said second circuit.

5. Apparatus for controlling the operation of heating equipment having an oil valve, ignition means and a motor, comprising switch means responsive to changes in heat generated by said equipment to cycle said equipment through a starting phase, a running phase and a stopping phase, a motor circuit including said switch means for energizing the motor during the starting and running phases, an ignition circuit including said switch means for energizing the ignition means during the starting phase, a motor-after-run switch including a bimetallic element and heater therefor for operating said motor for a predetermined period after the motor circuit is opened on the stopping phase, an oil valve circuit including said motor-after-run heater for energizing the oil valve on the starting phase, said motor-after-run heater being a negative temperature coefficient resistor for delaying actuation of said oil valve on the starting phase, and a reset switch interconnected with said switch means for stopping said equipment upon failure of ignition within a predetermined period and a shunt circuit including a resistor for shunting said reset switch upon ignition.

References Cited in the file of this patent

UNITED STATES PATENTS

| Number | Name | Date |
|---|---|---|
| 1,516,646 | Roseby | Nov. 25, 1924 |
| 1,517,042 | Anderson | Nov. 25, 1924 |
| 1,636,191 | McCabe | July 19, 1927 |
| 1,648,390 | McCabe | Nov. 8, 1927 |
| 1,941,540 | Denison et al. | Jan. 2, 1934 |
| 2,086,823 | Shaw | July 13, 1937 |
| 2,157,710 | Lake | May 9, 1939 |
| 2,159,342 | Persons | May 23, 1939 |
| 2,175,720 | Miller | Oct. 10, 1939 |
| 2,216,748 | Lindemann | Oct. 8, 1940 |
| 2,313,072 | Hotchkiss | Mar. 9, 1943 |
| 2,319,503 | Glogau | May 18, 1943 |
| 2,330,066 | McAlvay | Sept. 21, 1943 |
| 2,388,666 | Bower | Nov. 13, 1945 |
| 2,394,090 | McFarland | Feb. 5, 1946 |
| 2,440,700 | Rosche | May 4, 1948 |
| 2,490,095 | Rosche | Dec. 6, 1949 |
| 2,519,889 | Crawford | Aug. 22, 1950 |
| 2,581,636 | Cunningham et al. | Jan. 8, 1952 |
| 2,672,188 | Cassidy | Mar. 16, 1954 |
| 2,720,255 | Bishofberger | Oct. 11, 1955 |
| 2,772,727 | Schell | Dec. 4, 1956 |